United States Patent
Lim

(10) Patent No.: US 7,473,885 B2
(45) Date of Patent: Jan. 6, 2009

(54) SYSTEM AND METHOD FOR CALIBRATING THE LIGHT SOURCE FOR AN OPTICAL NAVIGATIONAL SYSTEM

(75) Inventor: Yeong Chuan Lim, Penang (MY)

(73) Assignee: Avago Technologies ECBU IP (Singapore) Pte. Ltd., Singapore (SG)

( * ) Notice: Subject to any disclaimer, the term of this patent is extended or adjusted under 35 U.S.C. 154(b) by 22 days.

(21) Appl. No.: 11/285,695

(22) Filed: Nov. 21, 2005

(65) Prior Publication Data

US 2007/0114360 A1    May 24, 2007

(51) Int. Cl.
*G06M 7/00*    (2006.01)
*G01J 1/32*    (2006.01)
*G06F 3/033*    (2006.01)

(52) U.S. Cl. ................... 250/221; 250/205; 345/163; 345/166

(58) Field of Classification Search ............ 250/205, 250/221, 222.1, 214 R, 214 A, 214 LS, 234, 250/239; 345/163, 166, 102; 372/38.01, 372/38.02, 38.07
See application file for complete search history.

(56) References Cited

U.S. PATENT DOCUMENTS

| | | | |
|---|---|---|---|
| 6,455,840 B1 * | 9/2002 | Oliver et al. | 250/222.1 |
| 6,963,059 B2 * | 11/2005 | Lauffenburger et al. | 250/205 |
| 7,280,099 B2 * | 10/2007 | Koay et al. | 345/163 |
| 7,280,575 B2 * | 10/2007 | Moran et al. | 372/38.02 |
| 2007/0114360 A1 * | 5/2007 | Lim | 250/205 |

\* cited by examiner

*Primary Examiner*—Georgia Y Epps
*Assistant Examiner*—Don Williams

(57) ABSTRACT

Advantage is taken of the fact that in optical navigation devices it is possible to measure the intensity of light impacting the pixel array of photo-diodes. Based upon such an intensity determination, a feedback signal is used to reduce the intensity of the light to a point where it is equal to or less than a predetermined value. In one embodiment, the discharge rate of a capacitive power supply is used to determine the intensity of the light source impacting the pixels. When the discharge rate is faster than a given amount the inference is that the light intensity is too great and power is reduced to the light source to reduce the intensity.

21 Claims, 2 Drawing Sheets

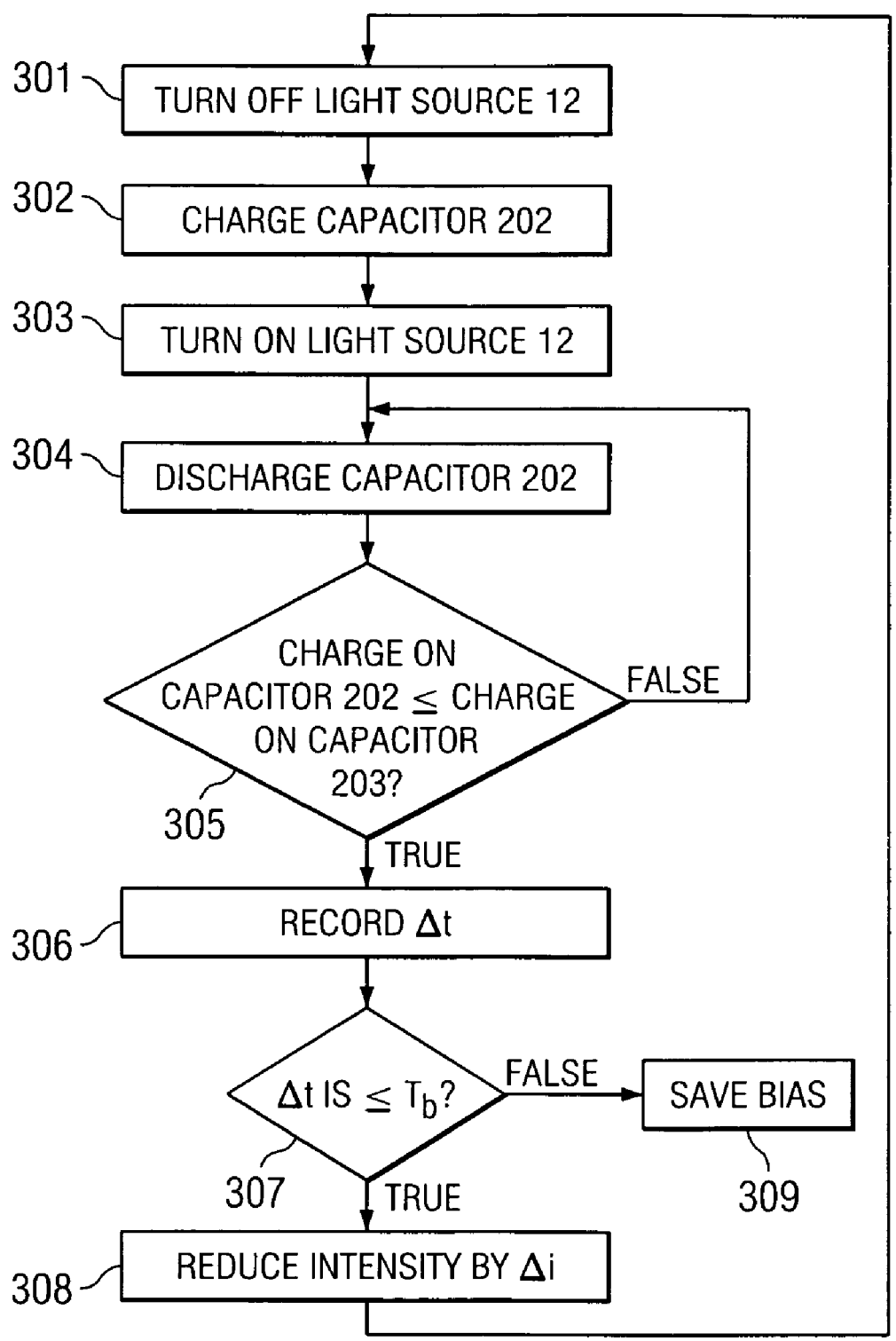

SYSTEM AND METHOD FOR CALIBRATING THE LIGHT SOURCE FOR AN OPTICAL NAVIGATIONAL SYSTEM

TECHNICAL FIELD

This invention relates to optical navigation systems and more particularly to systems and methods for calibrating the light source of such devices to be sure that coherent light from the device does not damage humans.

BACKGROUND OF THE INVENTION

It is now common practice that navigation devices (sometimes called a mouse) use coherent light (laser light) to illuminate the surface for navigation purposes. The coherent light reflects from surface imperfections onto a photo-detector array (pixels) thereby providing outputs from the array which are in turn used to determine the direction of movement of the device.

Since coherent light does not degrade with distance, if the light intensity is too great it can damage the human eye. Thus, during manufacture of device using coherent light (such as optical navigation devices) it is necessary to limit the light intensity to a level equal to or less than ($\leqq$) a fixed level. This is typically accomplished by limiting power to the light source based upon a light intensity reading. Typically, such calibration is accomplished manually by using a light meter to determine intensity levels and then reducing the power to a point where the intensity is $\leqq$ a particular value. At that point the power level is fixed, usually by reading desired power levels into a register which controls intensity. Once this register is set the power level can not be increased.

It is desirable to reduce manufacturing costs and to improve reliability by using a procedure that is automatic and which does not add complexity to either the manufacturing process or to the circuitry of the navigation device.

BRIEF SUMMARY OF THE INVENTION

Advantage is taken of the fact that in optical navigation devices it is possible to measure the intensity of light impacting the pixel array of photo-diodes. Based upon such an intensity determination, a feedback signal is used to reduce the intensity of the light to a point where it is equal to or less than a predetermined value. In one embodiment, the discharge rate of a capacitive power supply is used to determine the intensity of the light source impacting the pixels. When the discharge rate is faster than a given amount the inference is that the light intensity is too great and power is reduced to the light source to reduce the intensity.

BRIEF DESCRIPTION OF THE DRAWINGS

For a more complete understanding of the present invention, reference is now made to the following descriptions taken in conjunction with the accompanying drawings, in which:

FIG. 3 shows one embodiment of a flow chart for use with the optical device of FIG. 1.

DETAILED DESCRIPTION OF THE INVENTION

Figure 1:
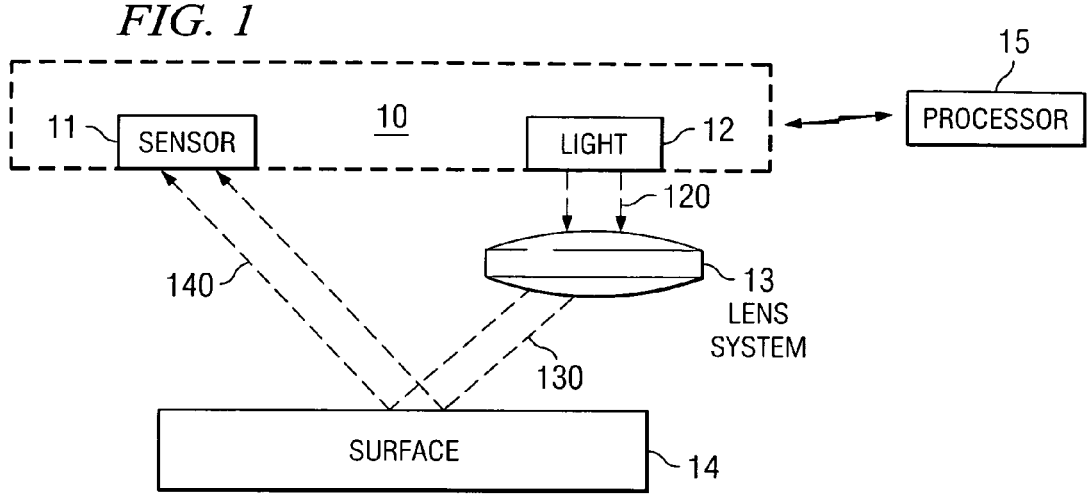
FIG. 1 is a simplified schematic side view of an embodiment of an optical navigation device employing the inventive concepts.

FIG. 1 is a simplified schematic side view of an embodiment of an optical navigation device 10 having light source 12 and pixel array (sensor) 11. The optical device may be located on a single integrated circuit such as circuit 10, wherein light channel 120 from light source 12 passes through lens 13 becoming light channel 130. Light channel 130 reflects from surface 14 becoming light channel 140, which then impacts upon sensor 11. Sensor 11 is any well-known sensor that operates to allow for the calculation of navigational movement by picking up reflected imperfections from a surface by a light beam projected onto the surface as the navigational device moves in relation to the surface.

If desired, surface 14 may be a prism or partially mirrored surface advantageously chosen to reduce (or otherwise modify) the intensity of light impacting sensor 11 to aid the adjustment process. Navigation device 10 can work, for example, in conjunction with processor 15.

Figure 2:
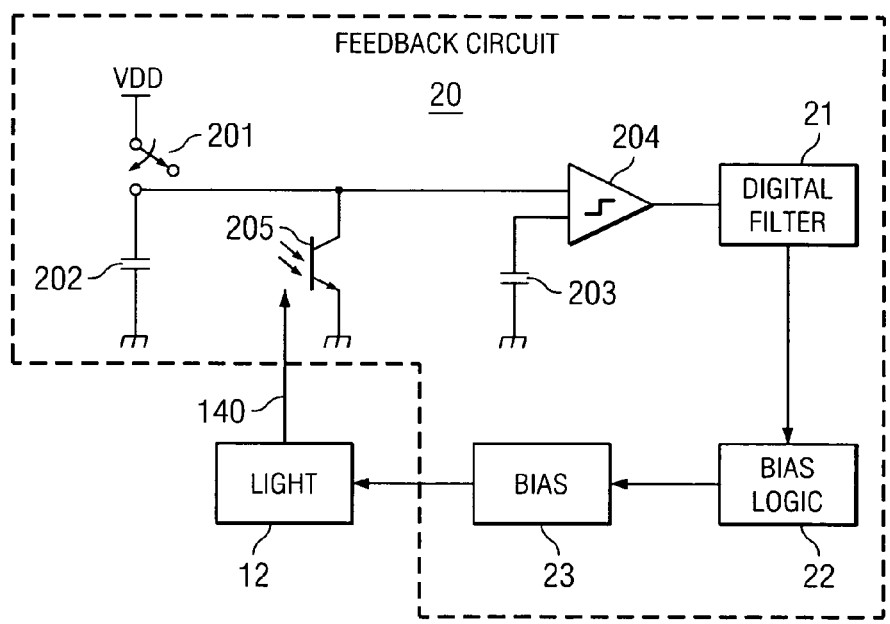
FIG. 2 is one embodiment of a circuit for controlling light intensity.

FIG. 2 is one embodiment of a circuit 20 for controlling light intensity. Light channel 140 from light source 12 impacts photo-diode array 205 corresponding to An embodiment of sensor 11 which draws its power from capacitor 202. At this point capacitor 202 begins to discharge. The intensity of the light from light source 12 drives the photo-diodes harder and this takes more power (voltage) from capacitor 202 making capacitor 202 discharge quicker. When capacitor 202 is appropriately charged, at time T, switch 201 is opened to begin the intensity measurement. When the charge of capacitor 202 becomes less than the reference charge of capacitor 203 (which was approximately one half of the charged value of capacitor 202) comparator 204 activates digital filter 21, which sends the value of $\Delta t$ (the time between when capacitor 202 begins to discharge and the time comparator 204 activated) to light source bias logic 22. If the value of $\Delta t$ is within a predetermined range of the value of $T_b$ corresponding to a safe intensity level, the adjustment process ends and the current bias level is maintained. Otherwise, bias logic 22 determines the proper amount to change the intensity. Bias logic 22 adjusts bias 23 of light source 12 by an amount $\Delta i$. The calibration process is restarted at the new intensity level. This procedure is iterated until $\Delta t$ falls within the accepted range such that, in one embodiment, the light intensity is below 6000 minimum erythema dose (MED). In such an embodiment, ideally the intensity would be above 2400 MED. Circuit 20 can be in whole or in part contained within device 10 or could be, in whole or in part, contained in processor 15. Note that in an actual circuit capacitor 203 would have to be continually recharged (not shown) which could occur each cycle. Showing such a recharge circuit in this drawing would unduly complicate the explanation, but such circuits are well-known in the art.

Some navigation devices could have built into them circuitry for measuring the intensity of light impacting pixel array 11. The purpose of such circuitry is to determine, based on light intensity impacting the pixel usage, how much time is necessary for insuring proper readings at any point in time. If a navigation device already utilizes such circuitry then such circuitry can also be used for calibrating the light source as described herein.

The value of Δi may be predetermined or may be calculated based on the measured value of Δt.

FIG. 3 illustrates one embodiment 30 of the flow of the adjustment process, which starts with process 301 in which, light source 12 is turned off. Capacitor 202 is charged via process 302, after which light source 12 (process 303) is turned back on, thereby beginning the discharge of capacitor 202 via process 304.

As shown in process 305, the charge on capacitor 202 continues to discharge until the charge on capacitor 202 is below the charge of capacitor 203. This amount of time is Δt (as discussed above) and is recorded at process 306. If Δt is $\leq T_b$, (process 307) corresponding to an improper bias creating an intensity that is too great, (i.e., the capacitor discharged too quickly) the bias will be changed (process 308) reducing the intensity by Δi and the flow restarted. Otherwise, if Δt is not $\leq T_b$, corresponding to a safe intensity level, the bias is saved to the device as shown by process 309.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. An optical navigation device comprising:
   light source;
   sensor for receiving light reflected from a surface to be navigated by said navigation device;
   feedback circuit for modifying the intensity of light emitted from said light source dependant upon light magnitude readings from said sensor;
   wherein said sensor is a light-sensitive device operating from a charged circuit such that the amount of current draw of said sensor is proportional to the amount of light impacting said sensor and wherein said feedback circuit depends, at least in part, on the discharge time of said charged circuit;
   wherein said discharge time is Δt and wherein if Δt is less than or equal to $T_b$ then said light intensity is reduced by an amount Δi, where $T_b$ is a known time corresponding to a situation where said light intensity is at a specified level which corresponds to human eye damage and Δi is a calculated amount.

2. The device of claim 1 wherein said calculated amount is a predetermined increment.

3. The device of claim 1 wherein said calculated amount is determined by the magnitude of Δt.

4. The device of claim 1 wherein said intensity is reduced by said feedback circuit to be a reduced level less than or equal to a pre-determined level; and
   means for maintaining said light intensity at said reduced level while said device is used for navigation purposes.

5. The device of claim 4 further comprising:
   means for adjusting said intensity during user operation of said device.

6. The device of claim 1 wherein the specified level which corresponds to human eye damage is about 6000 MED.

7. A method of testing an optical navigation device, said method comprising:
   enabling a light emitting source within said device for a period of time;
   allowing light emitted from said enabled source to impact a light-sensitive device within said device;
   changing the intensity of said emitted light based on a determined intensity of light impacting said light sensitive device operating from a charged circuit such that the amount of current draw of the light-sensitive device is proportional to the amount of light impacting said sensor, wherein changing the intensity depends, at least in part, on the discharge time of said charged circuit;
   wherein said discharge time is Δt and wherein if Δt is less than or equal to $T_b$ then said light intensity is reduced by an amount Δi, where $T_b$ is a known time corresponding to a situation where said intensity of said emitted light is reduced to a point less than or equal to a pre-determined value below a specified level which corresponds to human eye damage and Δi is a calculated amount.

8. The method of claim 7 further comprising:
   fixing said light intensity at said changed point.

9. The method of claim 7 wherein said pre-determined value is between about 2400 MED and 6000 MED.

10. The method of claim 7 wherein the specified level which corresponds to human eye damage is about 6000 MED.

11. A method of establishing the intensity of a light source within an optical navigation device, said method comprising:
    establishing said light source intensity by using existing controls within said device designed to adjust the time allowed for reading the output of a photo-detector pixel array based upon the time it takes to reduce a fixed charge of a power supply below a certain level to provide feedback for modifying the intensity of said light source to a desired level below a specified level which corresponds to human eye damage;
    maintaining said light intensity less than or equal to said desired level while said navigation device is being used.

12. The method of claim 11 wherein said establishing is performed during the manufacturing process of said device and not during consumer use of said device.

13. The method of claim 12 wherein said maintaining is performed both during said manufacturing process and during said consumer use.

14. The method of claim 11 wherein said desired level is between 2400 MED and 6000 MED.

15. The method of claim 11 wherein the specified level which corresponds to human eye damage is at 6000 MED.

16. A navigation device comprising:
    a stimulated coherent light beam;
    a plurality of photo-diodes to receive light reflected from a navigation surface;
    means for providing outputs representative of which photo-diodes are receiving said reflected light at a point in time;
    means based at least in part on provided ones of said outputs for determining the intensity of said light beam; and
    means based on said determined intensity for controlling the reduction of said intensity to a point where said intensity is less than or equal to about 6000 MED.

17. The device of claim 16 further comprising:

means for maintaining said reduced intensity over a period of time.

18. The device of claim 16 wherein said controlling means comprises:

means for reducing the power to said light beam in incremental values.

19. The device of claim 18 wherein said incremental values are pre-fixed values.

20. The device of claim 18 wherein said incremental values are dependant upon determined light beam intensities.

21. The device of claim 16 wherein said navigation surface artificially reduces the light received by said photo-diodes.

* * * * *